US012579014B2

(12) United States Patent
Deivasigamani et al.

(10) Patent No.: US 12,579,014 B2
(45) Date of Patent: Mar. 17, 2026

(54) METHOD AND A SYSTEM FOR PROCESSING USER EVENTS

(71) Applicant: MOENGAGE INC., San Francisco, CA (US)

(72) Inventors: Karthik Deivasigamani, Bangalore (IN); Yashwanth Kumar Kammara, Bangalore (IN); Nilesh Kumar, Bangalore (IN); Kotanjan Reddy Badri, Bangalore (IN); Raghav Tandon, Bangalore (IN); Vishal Surana, Bengaluru (IN); Ajish Nair, Pune (IN)

(73) Assignee: MOENGAGE INDIA PRIVATE LIMITED, Banglore (IN)

( * ) Notice: Subject to any disclaimer, the term of this patent is extended or adjusted under 35 U.S.C. 154(b) by 0 days.

(21) Appl. No.: 18/825,575

(22) Filed: Sep. 5, 2024

(65) Prior Publication Data

US 2025/0355728 A1     Nov. 20, 2025

(51) Int. Cl.
   *G06F 9/54*          (2006.01)
(52) U.S. Cl.
   CPC .............. *G06F 9/542* (2013.01); *G06F 9/546* (2013.01)
(58) Field of Classification Search
   None
   See application file for complete search history.

(56) References Cited

U.S. PATENT DOCUMENTS

| | | | |
|---|---|---|---|
| 10,122,783 B2 | 11/2018 | Qiao et al. | |
| 10,855,767 B1 | 12/2020 | Froh et al. | |
| 2013/0091192 A1* | 4/2013 | Shafi ....................... | G06F 9/546 |
| | | | 709/204 |
| 2014/0040903 A1* | 2/2014 | Hsu ........................ | G06F 9/5027 |
| | | | 718/103 |
| 2016/0077798 A1* | 3/2016 | Pradeep .................. | G06F 9/544 |
| | | | 710/53 |
| 2017/0075735 A1* | 3/2017 | Pradeep .................. | G06F 16/16 |
| 2019/0042322 A1* | 2/2019 | Calhoun ............. | H04L 41/0896 |
| 2019/0310899 A1* | 10/2019 | Oravivattanakul ..... | G06F 9/546 |
| 2021/0216536 A1 | 7/2021 | Rogers et al. | |

FOREIGN PATENT DOCUMENTS

WO     WO 2022083764 A1 *  4/2022  ............. G06F 9/505

* cited by examiner

*Primary Examiner* — Charles E Anya
(74) *Attorney, Agent, or Firm* — Jason A. Smith; Shumaker, Loop & Kendrick, LLP

(57)          ABSTRACT

A method for processing one or more user events is described. The method includes creating a data ingestor instance to process the one or more user events. A user event data associated with a tenant is retrieved, wherein the user event data is retrieved by polling a message store. Further, processing demand for the retrieved user event data is determined. Furthermore, a number of the data ingestor instance required to accommodate the processing demand is predicted. One or more clone ingestor instances are created dynamically based on the predicted number of data ingestor instance. Finally, allocate one or more clone ingestor instances for processing the one or more user events.

12 Claims, 4 Drawing Sheets

100

116

102

PROCESSOR(S) (108)

I/O INTERFACE (S) (110)

MEMORY (112)

114

Network 106

104-1

104-2

104-N

200

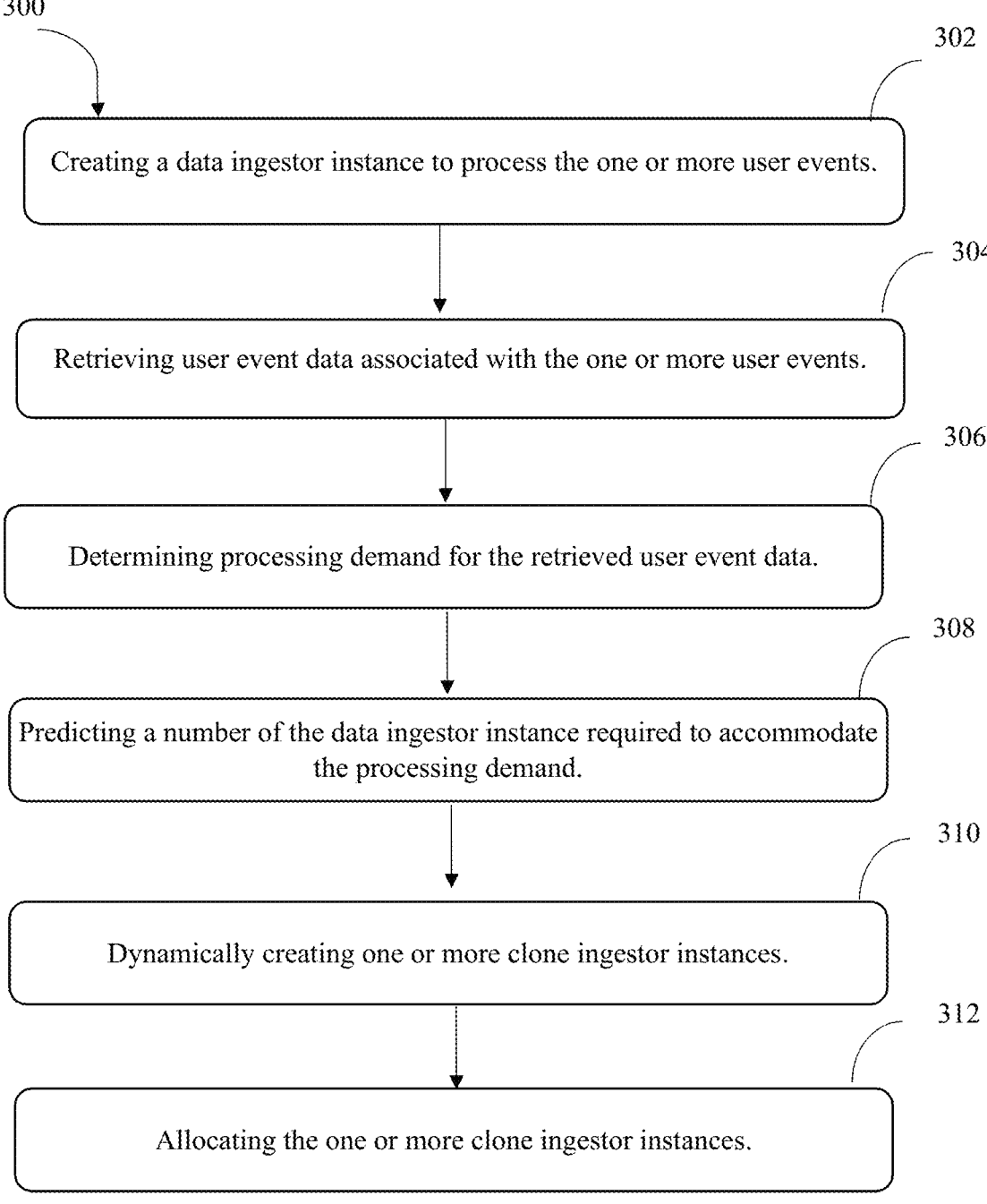

300

302

Creating a data ingestor instance to process the one or more user events.

304

Retrieving user event data associated with the one or more user events.

306

Determining processing demand for the retrieved user event data.

308

Predicting a number of the data ingestor instance required to accommodate the processing demand.

310

Dynamically creating one or more clone ingestor instances.

312

Allocating the one or more clone ingestor instances.

Figure 3

METHOD AND A SYSTEM FOR PROCESSING USER EVENTS

PRIORITY INFORMATION

The present application claims priority from Indian Patent Application number 202411020647 dated Mar. 19, 2024.

TECHNICAL FIELD

The present subject matter described herein, in general, relates to processing one or more user events.

BACKGROUND

Technology firms often find themselves tasked with the responsibility of managing user interactions across various mobile and web applications. To ensure that the technology firms can quickly retrieve and inquire about user data, it is crucial to seamlessly ingest information. Constructing such solutions poses challenges for Software as a Service (SaaS) providers, given the unpredictable nature of user behaviour across diverse web applications. The data intake system must exhibit flexibility to adapt to changing workloads from different applications, accommodating spikes in traffic from one without impeding the data processing time and speed of others. Maintaining fairness is essential to ensure consistent and equitable processing times for each of the applications, irrespective of their user activity levels. Also, different applications may require a different processing time. In the realm of variable and unpredictable user engagement, achieving the promised processing times become difficult and challenging.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for processing one or more user events. This summary is not intended to identify essential features of the claimed subject matter nor is it intended for use in determining or limiting the scope of the claimed subject matter.

In one implementation, a method for processing one or more user events is described. The method comprises creating a data ingestor instance to process the one or more user events. The one or more user events are associated with multiple tenants. Further, user event data associated with one or more user events is retrieved, wherein the user event data is retrieved by polling a message store. Further, processing demand for the retrieved user event data is determined. Furthermore, a number of the data ingestor instance required to accommodate the processing demand is predicted. One or more clone ingestor instances are created dynamically based on the predicted number of data ingestor instance. Finally, one or more clone ingestor instances are allocated for processing the one or more user events.

In yet another implementation, a system for processing one or more user events is described. The system comprises a memory and at least one processor to execute one or more instructions stored in the memory for creating a data ingestor instance to process the one or more user events. The one or more user events are associated with multiple tenants. Further, user event data associated with one or more user events is retrieved, wherein the user event data is retrieved by polling a message store. Further, processing demand for the retrieved user event data is determined. Furthermore, a number of the data ingestor instance required to accommodate the processing demand is predicted. One or more clone ingestor instances are created dynamically based on the predicted number of data ingestor. Finally, allocate one or more clone ingestor instances for processing the one or more user events.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for processing one or more user events is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

FIG. 3 illustrates a method for processing one or more user events.

Figure 1:
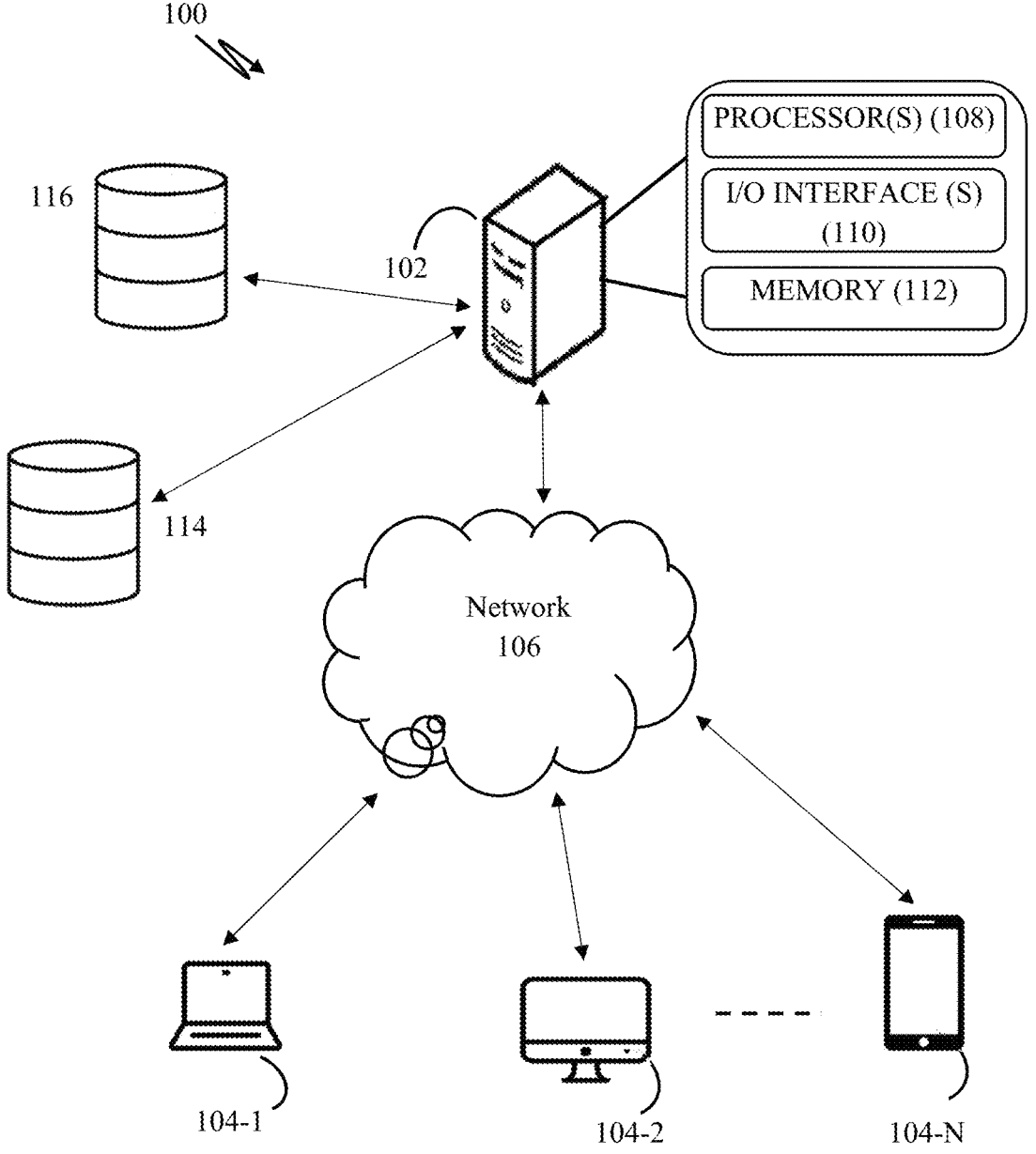
FIG. 1 illustrates a network implementation for processing one or more user events, in accordance with various embodiments of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "retrieving", "creating", "determining", "predicting", and "allocating" and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for processing one or more user events. A user event of the one or more user events may encompass a wide range of actions user take within mobile or web tenant applications. The examples of user event may include but are not limited to page views, click events, form submissions, login and logout events, product interactions, search queries, and the like. In an embodiment, the one or more user events are associated with a tenant application. In the realm of software, a tenant application is a software service or application designed for and utilized by a specific user or organization within a single or multi-tenant system. Each tenant operates in an isolated space, ensuring privacy and security by keeping their data and configurations separate from other tenants in the shared environment. The tenant applications may also be referred as tenants.

In order to manage the large volumes of user events from multiple tenants a scalable infrastructure is required, ensuring that the system can efficiently handle increasing workloads without sacrificing performance. Another technical challenge is to ingest data for users to have timely access to information. Developing a system that can seamlessly ingest and process data without delays poses another technical challenge. Also, because of the unpredictability of user behaviour across one or more tenants a flexible and responsive data ingestion system is needed to adjust to the changing workload. One of the concerns is managing the fluctuating workload from several tenant applications. To ensure that no tenant is starved of resources, the system must be able to adapt to manage unexpected increase in traffic from a single tenant while maintaining equitable processing for all tenants. Also, it should be ensured that different tenant applications requiring different processing times should be met. The proposed method and system offer a solution to these technical issues and provide various advantages as will be clear from the following description.

Referring now to FIG. 1, a network 100 implementation for processing the one or more user events is illustrated. The network 100 includes a system 102, one or more user devices 104-N (for example but not limited to one or more user devices 104-1, 104-2 . . . 104-N) associated with one or more users, data storage device 114, and data storage device 116. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In one implementation, the system 102 may be implemented in a cloud-based computing environment in which the system is configured to execute or interact with remotely located applications. Further, system 102, storage devices 114, 116, and user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

In an embodiment, the system 102 may store data in the storage devices 116, 114, at different stages of processing the user events. In an embodiment, the storage device 116 may be a log structured storage device. A log-structured storage device may have a data storage architecture where data is organized and managed in a sequential log, which is a continuous, append-only file. Instead of updating existing data in place, new data is continuously appended to the end of the log. In an embodiment, the storage device may have separate dedicated logs for different tenants. In yet another embodiment, the storage device may have same log dedicated to multiple tenants. In the storage device 116, data recovery procedures become simpler because changes to the data are additions at the end of the log. Recovering from a system failure or corrupted data entails playing back the log in order from the beginning. In an embodiment, the storage device 114 may be a persistent datastore. The persistent datastore may retain the data even when the system is powered off. In an embodiment the storage devices 116, 114 may reside on the system 102. In yet another embodiment, the storage devices 116, 114 may reside outside the system 102 and may be communicatively coupled to the system 102.

In operation, the system 102 may determine a number of one or more user events pending for processing, such that the one or more user events are associated with a tenant. To this end, the system may predict a number of data ingestor instance required to process the pending user events and dynamically clone the data ingestor to create one or more clone ingestor instances for processing the user events.

Figure 2:
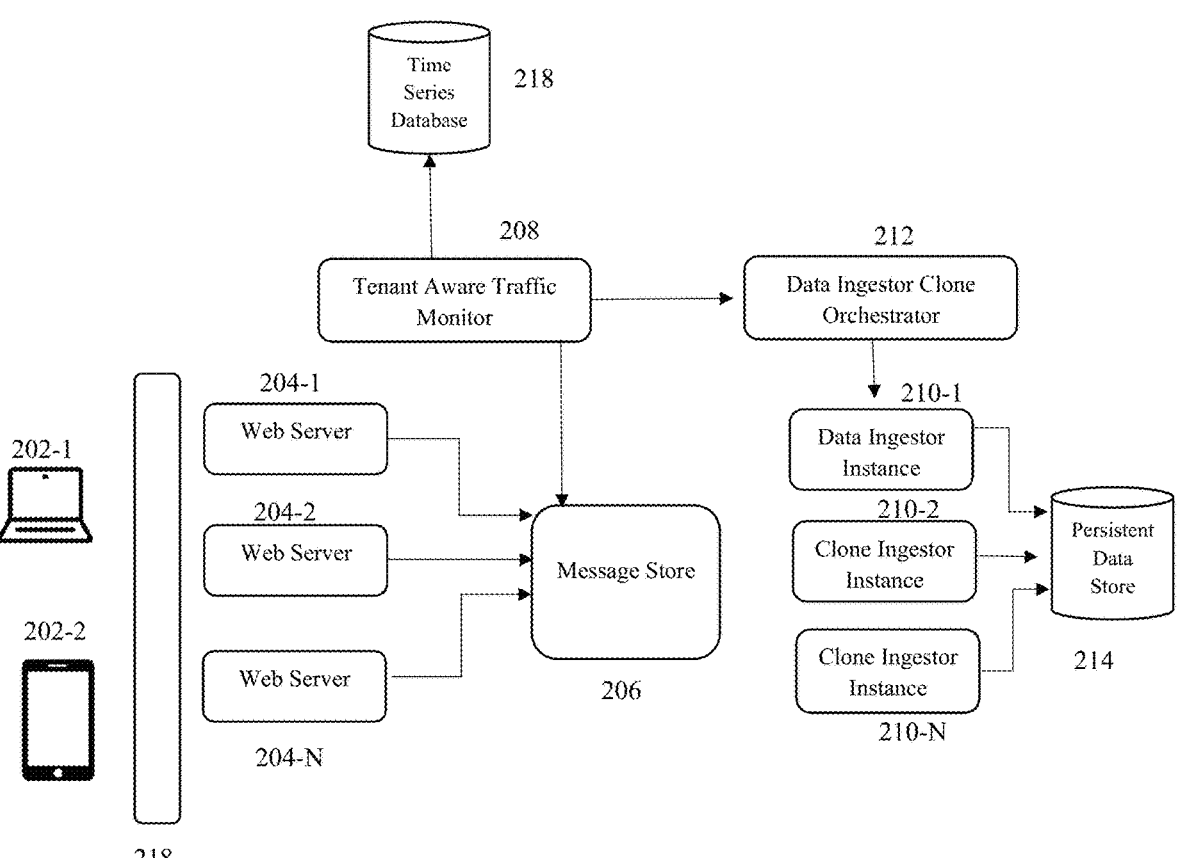
FIG. 2 illustrates a block diagram of a system for processing one or more user events, in accordance with various embodiments of the present subject matter.

The detail functioning of the system 102 is described below with the help of FIG. 2. Referring now to FIG. 2, a detailed diagram of the network 100 comprising one or more components of the system interacting with the user device, via web or mobile applications. In an embodiment, the system 102 may be configured to receive the one or more user events via an API (Application Programming Interface). The one or more user events may be transmitted to the system via a web application or mobile application installed on a user device 202-1, 202-2, collectively referred as 202. The system may be hosting a web server (204-1, 204-2 . . . 204-N) to receive the one or more user events in the form of HTTP requests. The web server may function as an entry point for processing and recording the one or more user events. As discussed above, the examples of user events may include but not limited to page views, click events, form submissions, login and logout events, product interactions, search queries, and the like. In an embodiment, the tenants (web or mobile applications) may invoke specific API's on the web server 204 to record the one or more user events performed by multiple users of multiple tenants. In an embodiment, the web server 204 may be a part of the system 102. In yet another embodiment, the web server 204 may be a separate entity than the system 102. These APIs are designed to receive and process user event data associated with the one or more user events. The user event data associated with the user events may include tenant application and its type, user action, event type, user ID, tenant ID, timestamp, event specific data, and any other relevant details associated with the user events. This may be understood with the help of an example, a user interacts with an ecommerce website by adding a product to their shopping cart. The web server may receive the user event (i.e. addition of the product to the cart) and the associated user event data through the API. The user event data may include details regarding the ecommerce website (tenant application), user's action, product added, the user's identifier, timestamp, and any other relevant metadata.

In an embodiment, as shown in FIG. 2 the system 102 may use a load balancer 218 to distribute incoming network traffic from the user devices 202 across multiple web servers 204 to ensure optimal resource utilization, maximize throughput, and minimize response time. When a user event is received, the load balancer may perform one or more steps like, evaluating current load on the web servers 204 and selecting a web server from the web servers 204 based on the current load to process the received user event. The load balancer continuously monitors the health and performance of the web servers. If a web server becomes unavailable or experiences increased load, the load balancer may reroute traffic to other available web servers.

In an embodiment, the web servers 204 may be configured to store the received one or more user events, in a message store 206. The message store may correspond to the storage device 116 in FIG. 1. The user event along with the user event data may be stored in the message store, based on at least on of: the user ID and tenant ID. In an embodiment, the user event data associated with the one or more user events may be stored or written in an asynchronous manner, in the message store 206. For example, when a user event occurs, the system (via the processor 108) may not handle the storage operation immediately because the system may have to wait for the confirmation from the message store 206 before starting the storing process. Thus, waiting for the confirmation from the message storage before proceeding to store may slow down the overall system's performance and reduce throughput.

Instead, the system may continue with other tasks without waiting to write user event data along with the user event in the message storge. For example, the system may trigger a query to the message store 206 to execute a write operation (i.e., storing) seamlessly alongside its own ongoing execution, thus offloading the responsibility of managing the write operation from its execution environment. Subsequently, the system may set up a confirmation mechanism to await confirmation from the message store regarding the completion of the write operation. In the confirmation mechanism, the system may register for a callback function that the message store may perform when the writing operation has been completed. In an embodiment, the callback mechanism may be configured to run in a separate thread pool from the system's primary execution thread in order to maximize system speed and resource use.

In an embodiment, upon successful storage of the user event along with the user event data in the message store 206, the system may receive a notification confirming the successful storage. The user event along with the user event data herein after may be referred as information associated with the user event. In an embodiment, the system may transmit an acknowledgement upon receiving the notification. In yet another embodiment, when the information associated with the user event fails to be stored successfully, the system may receive a notification signalling the failure of the storage operation. The system may again send a query to, the message store, to retry the storage operation. The retry mechanism ensures that the information associated with the user event may be kept in the datastore permanently, even in the event of temporary failures or network issues. This technique of asynchronous storage of information associated with the user event increases system's throughput and resilience by separating the write operation from the system's main execution thread and utilizing asynchronous callback mechanisms. This guarantees effective and dependable processing of user events even under demanding operational conditions. The asynchronous storage method ensures writing of the information associated with the user event to the message store within milli-seconds of receiving the user events from the tenant application.

In an embodiment, the system may distribute uniformly the received one or more user events associated with the tenant into message store 206. The uniform distribution ensures prevention of any single tenant's information associated with the user event from overwhelming a specific log within the distributed log-based message store. By uniform distribution it may be understood that instead of centralising all tenant related information associated with the user event in one place, the system makes sure that the data is distributed uniformly among various logs or partitions in the message store. By distributing the data uniformly, the system aims to balance the workload and ensure that no individual tenant disproportionately impacts a particular log's capacity or processing capabilities. The number of partitions or the log may be predetermined and fixed based on factors such as the system's capacity and performance requirements. In an embodiment, before storing a user event in the message store, the system may perform hashing on the unique tenant identifier associated with the user event. To generate hash value or hash codes, the system may use any of the hashing algorithms: MD5, SHA-1, SHA-256, and the like known or to be known in the future. In the hashing process, a hash value may be generated which may be numeric or alphanumeric representation of the unique tenant identifier. Subsequently, the generated hash value may be assigned to a particular log or partition of the message store. The system may store the information associated with the user event the partition having the assigned hash value. Thus, each partition or log of the message store may hold information associated with the user event data from several tenants, making sure that no one tenant's data fills up a specific log in the message store. In an embodiment, the hashing may be performed using the unique user ID. In an embodiment, a log in the message store corresponding to a tenant may further be divided into multiple partitions to accommodate multiple user events corresponding to same tenant or different tenants. For example, a log may refer to a record or journal that stores information regarding user events. In an embodiment, the architecture of the message store may be designed to be scalable, allowing for the addition of new logs or partitions in case there is a surge in the user events. This scalability ensures that the system can handle growing workloads while maintaining a uniform distribution. In an embodiment, the system may create a data ingestor instance to process the one or more user events stored in the message store. The data ingestor instance may be a component, process, function, or subroutine in the system to collect, process, analyse or store the one or more user events.

In an embodiment, the system is configured to poll, via a tenant aware traffic monitor 208, the message store 206 to retrieve user event data associated with one or more tenants. For example, user events corresponding to the tenant are stored in the message store before processing them. The user event data associated with the user events may include, number of user events corresponding to a tenant pending for processing or total number of user events corresponding to the tenant pending for processing, and the like. In an embodiment, upon each polling cycle, the tenant aware traffic monitor may communicate the user event data corresponding to a number of the pending user events, to a data ingestor clone orchestrator 212. The frequency of polling by the tenant aware traffic monitor 208, may be predetermined or dynamically adjusted based on specific requirements. In an example scenario, the tenant aware traffic monitor may poll the message store at a regular interval of time to determine if there are pending user events. The tenant aware traffic monitor may keep a track of time stamp associated with the last poll performed to ensure when to start the next polling activity.

In an embodiment, the tenant aware traffic monitor 208 upon retrieving the number of pending user events, may predict the number of user events to be processed within a designated timeframe. The number of user events may fluctuate due to factors such as festive offer provided on a tenant application, or a new update or feature is being pushed by the tenant application. The fluctuation may include increase in the user events or decrease in the user events associated with one or more tenants. Further, the tenant aware traffic monitor may predict the fluctuation in the incoming user event traffic by analysing past traffic patterns. The past traffic patterns may include trend associated with the number of user events being received from multiple tenant applications at a particular time of a day, month, or year. For example, during certain hours, user events from tenant A may dominate, while at other times, those from tenant B may be received. Similarly, user events from tenant C increases at a particular time of every year, like Christmas. The tenant aware traffic monitor may utilize this data to discern traffic patterns or trends associated with individual tenant applications, such as A, B, and C, at a current time/date. The traffic patterns/trends may be stored in a time series database 218 of FIG. 2. In an embodiment, the tenant aware traffic monitor may retrieve and analyse the stored past traffic patterns from the time series database and predict future trends using predictive modelling techniques. For example, the tenant aware traffic monitor may use techniques such as statistical models, machine learning, and the like. In an embodiment, the machine learning model may be trained on past traffic pattern to learn patterns and trends of user events of a tenant occurring at a specific time and make predictions about future traffic levels for that tenant.

In an embodiment, upon receiving the user event data from the tenant aware traffic monitor, the data ingestor clone orchestrator 212 may determine the processing demand for the retrieved user event data. For example, upon receiving the number of user events pending for processing the data ingestor clone orchestrator 212 may predict a number of the data ingestor instance required to process the pending user events. The data ingestor clone orchestrator 212, may predict the number of data ingestor instances based on one or more of: the predicted fluctuation in the number of the one or more user events, number of user events pending in the message store for processing, amount of time taken to process a user event, to achieve promised processing time to a tenant, processing speed for a respective user event, or resource utilization. In yet another embodiment, the prediction of the number of the data ingestor instances may be on a machine learning model. The machine learning model may be trained on previous dataset comprising details related to number of data ingestor instances required in previous processes to process corresponding number of user events. The machine learning model may continuously learn the trend of the number of data ingestor instances being used in previous processes and can efficiently predict the resources required. This may be understood with a help of an example: upon determination of the surge in the number of user events, such as in next 10 minutes or hours, the tenant aware traffic monitor 208 may send an alert to the data ingestor clone orchestrator 212. Upon receiving the alert, the data ingestor clone orchestrator 212 may determine if additional number of data ingestor instances may be required to process the predicted surge in the user events. Subsequently, the data ingestor clone orchestrator 212 may analyse current capacity, processing power, memory, workload of present data ingestor(s) for the determination of additional resources. In an embodiment, upon determination that additional number of data ingestor instance may be required, data ingestor clone orchestrator 212 may dynamically clone the data ingestor instance to create one or more clone ingestor instances. The creation of the one or more clone ingestor instances may involve creating a duplicate or replica of the data ingestor instance 210-1, allowing for parallel or distributed processing of the user events. In yet another example, the one or more clone ingestor instances may be dynamically created based on one or more pending user events in the message store. For example, if the number of user events pending to be processed are greater than a predetermined threshold value, the system via the data ingestor clone orchestrator 212 may create one or more clone ingestor instances required for processing. For example, the number of clone ingestor instances created may be proportional to the number of pending user events to be processed.

In yet another example, the one or more clone ingestor instances may be dynamically created based on the processing time promised to each of the tenant application. For example, the system may assign a predetermined processing time to each tenant, for processing their corresponding user events. The processing time assigned may be based on predefined agreements or SLAs (Service Level Agreement). The data ingestor clone orchestrator 212 may continuously monitor that if the user events corresponding to a specific tenant are being processed according to a time promised in the agreement. Upon determining, that the promised processing time is not being met for the specific tenant, the data ingestor clone orchestrator 212 may dynamically create the clone of one or more data ingestor instances for further processing. This can be understood with the help of an example, like if the promised processing for tenant A may be 10 milliseconds for 5 user events. The data ingestor clone orchestrator may monitor and determine that may be due to surge in the traffic the data ingestor instance are not able to process the user events of the tenant A in promised time. Hence, the data ingestor clone orchestrator may create one or more clone ingestor instances to achieve the promised processing time. In yet another embodiment, the data ingestor clone orchestrator may dynamically create the one or more clone ingestor instances upon determination that amount of time required for processing user events for a respective tenant exceeds a predetermined threshold. In yet another example, data ingestor clone orchestrator may dynamically create the one or more clone ingestor instances upon determination that the processing speed of the current data ingestor instance is not up to the mark. For example, the data ingestor instance is not processing user events with a predetermined processing speed.

In an embodiment, to create the one or more clone ingestor instances of the data ingestor instance, the data ingestor clone orchestrator 212 may record metadata, configuration settings, and other parameters of the data ingestor 210-1 like connections between data sources, the processing logic, and the output destinations. The one or more clone ingestor instance of the data ingestor instance may be created, either on the same server or on a different server in a distributed environment. This may involve replicating the software environment, including dependencies and libraries. The configuration settings and metadata recorded by the data ingestor clone orchestrator 212, are applied to the one or more clone ingestor instances. This may ensure that the new cloned data ingestor instances operates similarly to the data ingestor instance in terms of data processing logic and output. In an embodiment, the cloned data ingestor instances may have all the necessary access credentials and connection details to pull data from external data sources. For example, duplicating or sharing authentication tokens, API keys, or other access mechanisms. In an embodiment, where multiple cloned data ingestor instances may exist, a load balancing mechanism may be implemented by the system to distribute incoming data across the various instances evenly. This may ensure efficient resource utilization and improved performance.

In an embodiment, the data ingestor clone orchestrator 212 may allocate the one or more clone ingestor instances for processing the one or more user events. The data ingestor clone orchestrator 212 may use one or more techniques for allocation of the data ingestor and the one or more clone ingestor instances. For example, round robin, weighted round robin, hashing, random allocation, priority-based allocation, and the like. Upon allocation, the data ingestor clone orchestrator 212 may initiate the allocated one or more clone ingestor instances for processing. To this end, the data ingestor clone orchestrator 212 may perform one or more of computing of resources for a respective clone ingestor instance (like memory, CPU, etc), selecting an operating system, determining tools/libraries required for data processing, integrating the ingestor instance with the system, implementing health checkup mechanisms, configuring processing logic, and the like. In an embodiment, once the system implements a polling mechanism and identify one or more pending user events in the message store, the system may process the user event and the user event data associated with the one or more user events. The user event data may be processed by the data ingestor instance and one or more clone ingestor instances. The data ingestor and one or more clone ingestor instances may capture the user event data like user action, timestamp, event type, user ID, session ID, tenant ID, and specific attributes related to the one or more user events (e.g., clicked element, browsed page, added item to cart). In an embodiment, the at least one of data ingestor instance and one or more clone ingestor instances may process the captured user event data and the user event by initially parsing the user event data. Parsing the user event data may include extracting the captured user event data associated with one or more user events. In an embodiment, the system may validate the parsed user event data to determine if the user event data is being received from an authenticated tenant. The system may validate the authentication by using digital signatures, token key, or digital certificates. After the validation, the at least one of data ingestor instance and one or more clone ingestor instances may process the user event data associated with the one or more user events. For example, a user upon browsing an ecommerce website, chooses a product and add it to the shopping cart. This user event of adding product to the shopping cart is received by a webserver and is stored in the message store. As part of processing this user event, the product name, quantity, price, and any other pertinent information are updated in the cart to reflect the addition of the chosen item.

In an embodiment, the system may store the processed one or more user events in a persistent datastore 214. The system may store the processed information associated with the user events in an asynchronous non-blocking manner. In a non-blocking manner, the system allows the storage task to occur independently and potentially in the background. For example, the system may trigger a query to the persistent datastore to execute a write operation (i.e., storing) seamlessly alongside its own ongoing execution, thus offloading the responsibility of managing the write operation from its execution environment. Subsequently, the system may set up a confirmation mechanism to wait confirmation from the persistent datastore regarding the completion of the write operation. For the confirmation, the system may register for a callback function that the message store may perform when the writing operation has been completed. In an embodiment, the callback function may be configured to run in a separate thread pool from the system's primary execution thread in order to maximize system speed and resource usage. In an embodiment, upon successful storage of the processed user event and the user event data associated with the user event, the system may receive a notification confirming successful storage of the user event and user event data. In an embodiment, the system may transmit an acknowledgement upon receiving the notification. In case there is a failure in the data storage operation a notification indicating the same is being transmitted by the system. To this end, the system may again send a query to, the message store, to retry the storage operation. The retry mechanism ensures that the user event and user event data associated with the user event may be kept in the persistent datastore permanently, even in the event of temporary failures or network issues.

Regarding system responsiveness, non-blocking storage offers a number of benefits. The system is more efficient because it can handle multiple events and tasks while the storing operation is underway. Particularly, this is helpful in situations where it is necessary to respond quickly to user inputs or where storage operations may have variable latency. In order to ensure that the persistent datastore is not choked the system implements an acknowledgment mechanism. For this, the data ingestor instance receives notifications of writes from the datastore at periodic intervals before making additional writes of the processed information associated with the user events in the persistent data store.

In an embodiment, the data ingestor clone orchestrator 212 may terminate dynamically the one or more clone ingestor instances based on a number of user events pending in the message store. To this end, upon polling the message store, the tenant aware traffic monitor 208 may transmit the number of the pending user events to the data ingestor clone orchestrator 212. Upon receiving the number of the pending user events, the data ingestor clone orchestrator determines if the received number is less than a predefined threshold. Following this determination, one or more clone ingestor instances are dynamically terminated by the data ingestor clone orchestrator 212. The number of clone ingestor instances that are terminated is inversely proportional to the number of pending user events. In yet another embodiment, the system may perform continuous monitoring, via the tenant aware traffic monitor 208, to identify if a predefined number of the one or more clone ingestor instances are sitting idle for a predefined amount of time. Upon identification, that the predefined number of the one or more clone ingestor instances are sitting idle for the predefined amount of time, the tenant aware traffic monitor 208 may transmit a notification to the data ingestor clone orchestrator 212. The data ingestor clone orchestrator 212 may then, after receiving the notification, initiate termination of the clone ingestor instances. In an embodiment, the system may generate an alert when the predefined number of the one or more clone ingestor instances are sitting idle for the predefined amount of time. In yet another embodiment, the data ingestor clone orchestrator 212 may dynamically terminate the one or more clone ingestor instances based on one or more: resource utilization, promised processing time being achieved, predicted traffic level, and the like.

In an embodiment, the data ingestor clone orchestrator 212 may monitor one or more clone ingestor instances to update the allocation of a clone ingestor instance to a tenant of multiple tenants. For example, upon determination that the one or more pending events corresponding to tenant A have gone below the threshold value and the one or more resources of the clone ingestor instances are not being used at their full capacity, the data ingestor clone orchestrator may redistribute the clone ingestor instance currently assigned to tenant A. Instead, the system may update the allocation of the clone ingestor instance to a tenant B whose processing user events are pending. This dynamic allocation optimizes resource utilization across the system, ensuring that clone ingestor instances are efficiently utilized to handle pending user events from multiple tenants. The data ingestor clone orchestrator may monitor the one or more resources by calculating metrics associated with at least one of processor, memory, and associated delay in processing a user event. For example, the data ingestor clone orchestrator continuously monitors CPU usage of the clone ingestor instances. This may involve tracking metrics such as the number of active processes, and the average load on the CPU over time, no of CPU cores utilized and number of CPU cores underutilized over a period of time etc. Further, memory usage of the clone ingestor instances is also monitored to ensure efficient utilization of available RAM. Metrics such as total memory consumption, memory allocation by running processes, and memory utilization trends may be monitored over time. Additionally, the data ingestor clone orchestrator tracks delay in processing user events by the clone ingestor instances. This may involve measuring the time taken from when an event is received until it is fully processed and stored. Metrics related to event processing time, latency, and throughput may be calculated and monitored to assess the efficiency of event processing. The collected data on processor usage, memory utilization, and event processing delay may be processed and analyzed by the data ingestor clone orchestrator. In an embodiment, calculation of metrics may involve aggregating and summarizing the data to derive meaningful insights, such as average CPU usage, memory consumption patterns, and average event processing latency. Analytical techniques, including statistical analysis and trend analysis, may be applied to identify patterns, anomalies, or performance bottlenecks in resource utilization and event processing.

Referring now to FIG. 3, a method 300 for processing one or more user events, is shown, in accordance with one or more embodiments of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The method 300, referring to FIG. 3, for processing one or more user events may be implemented in any suitable hardware, software, firmware, or combination thereof. However, for ease of explanation, in the embodiments described below, the method 300 may be considered to be implemented in the network 200 of FIG. 2 by the processor(s) 108 of the system 102 in association with the other devices in the network 200.

At step 302, the system may create a data ingestor instance to process the one or more user events. The one or more user events are associated with a tenant.

At step 304, the system may retrieve user event data associated with one or more user events. The user event data is retrieved by polling a message store.

At step 306, the system may determine processing demand for the retrieved user event data.

At step 308, the system may predict a number of the data ingestor instance required to accommodate the processing demand.

At step 310, the system may dynamically create one or more clone ingestor instances based on the predicted number of data ingestor instance.

At step 312, the system may allocate the one or more clone ingestor instances for processing the one or more user events.

Exemplary embodiments discussed above may provide certain advantages. Though not required to practice aspects of the disclosure, these advantages may include those provided by the following features.

Figure 4:
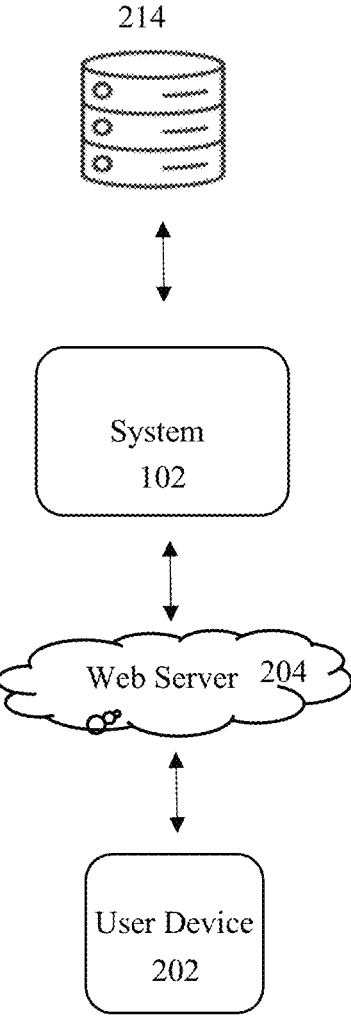
FIG. 4 illustrates an exemplary embodiment of processing one or more user events.

Referring to FIG. 4, this figure depicts an example for understanding of an embodiment of an invention. Consider a user adding a product to their shopping cart in an ecommerce tenant application installed on a user device 202. This user event is sent to the web servers 204 via HTTP based API. The information associated with the user event is now received by the web server 204 and the system 102 writes this information associated with the user event to the distributed message store. The data ingestor instance will now process the information associated with user event from the message store and then write it into a persistent datastore 214. Now if the ecommerce tenant application is running a sale and starts receiving multiple requests from its users then the system 102 may observe a surge in the incoming traffic or of user events from the ecommerce tenant application. This can overwhelm the data ingestor instance and can starve other tenants' data from getting processed. By dynamically cloning the data ingestor instance process depending on the traffic pattern, the system is to guarantee that every tenant of the system 102 has their events processed within a promised processing time.

Some embodiments of the disclosure provide an improvement in the efficiency of the system by cloning the data ingestor instance to process the pending tasks.

Some embodiments of the disclosure improve the processing speed of the system by cloning the data ingestor instance.

Some embodiments of the disclosure process and write to the persistent datastore in an async non-blocking manner using a periodic checkpoint mechanism to extract maximum throughput from the datastore without overloading it.

Some embodiments of the disclosure provide dynamic adjustment of processing units of the system to the incoming traffic at a tenant level.

Some embodiments of the disclosure provide distribution of the user events uniformly across all the tenants, ensuring processing times across tenants, such ensure that there is no hotspot.

Some embodiments of the disclosure write to the persistent datastore in an asynchronous non-blocking fashion to ensure that the data ingestor instance is able to handle large volumes of user event data concurrently.

Although implementations for methods and system for processing one or more user events have been described in language specific to structural features and/or methods, it is to be understood that the appended claims are not necessarily limited to the specific features or methods described. Rather, the specific features and methods are disclosed as examples of implementations for processing one or more user events.

The invention claimed is:

1. A method for processing user event data associated with one or more user events, the method comprising:
retrieving the user event data associated with the one or more user events, wherein the user event data is retrieved by polling a message store, and wherein the one or more user events are associated with one or more tenant applications;
predicting a number of data ingestor instance required to process the retrieved user event data associated with a tenant application of the one or more tenant applications, wherein the number of the data ingestor instance predicted are is dependent on completing processing of the retrieved user data for the tenant application within a predefined time allocated to the tenant application, fluctuation in the number of the one or more user events, number of user events pending in the message store for processing, and processing speed for a respective user event;
dynamically creating one or more clone ingestor instances based on the predicted number of the data ingestor instance; and
allocating the one or more clone ingestor instances and the data ingestor instance for processing the user event data associated with the tenant application.

2. The method as claimed in claim 1, further comprises:
receiving the one or more user events via an application programming interface (API); and
asynchronously storing the one or more user events in the message store in a distributed log structure.

3. The method as claimed in claim 1, wherein the one or more clone ingestor instances are allocated by a data ingestor clone orchestrator, wherein the data ingestor clone orchestrator initiates a clone ingestor instance from the one or more clone ingestor instances.

4. The method of claim 1, further comprises:
dynamically terminating the one or more clone ingestor instances based on a number of pending user events in the message store.

5. The method of claim 1, wherein processing the one or more user events comprises processing the user event data including:
parsing the user event data associated with the one or more user events;
validating the user event data associated with the one or more user events; and
processing the user event data associated with the one or more user events.

6. The method as claimed in claim 1, further comprises:
monitoring a resource of one or more clone ingestor instances to update the allocation of a clone ingestor instance to the tenant, wherein monitoring of the one or more resources include calculating a metrics associated with at least one of a processor, a memory, and an associated delay in processing a user event.

7. A system for processing user event data associated with one or more user events, the system comprises:
a memory storing one or more instructions;
a processor communicatively coupled with the memory, wherein the processor executes the one or more instructions for:
retrieve the user event data associated with the one or more user events, wherein the user event data is retrieved by polling a message store, and wherein the one or more user events are associated with one or more tenant applications;
predict a number of data ingestor instance required to process the retrieved user event data associated with a tenant application of the one or more tenant applications, wherein the number of the data ingestor instance predicted are is dependent on completing processing of the retrieved user data for the tenant application within a predefined time allocated to the tenant application, fluctuation in the number of the one or more user events, number of user events pending in the message store for processing, and processing speed for a respective user event;

dynamically create one or more clone ingestor instances based on the predicted number of the data ingestor instance; and allocate one or more clone ingestor instances and the data ingestor instance for processing the user event data associated with the tenant application.

8. The system as claimed in claim 7, wherein the processor is further configured to:

receive the one or more user events via an application programming interface (API); and asynchronously store the one or more user events in the message store in a distributed log structure.

9. The system as claimed in claim 7, wherein the one or more clone ingestor instances are allocated by a data ingestor clone orchestrator, wherein the data ingestor clone orchestrator initiates a clone ingestor instance from the one or more clone ingestor instances.

10. The system of claim 7, wherein the processor is further configured to:

dynamically terminate the one or more clone ingestor instances based on a number of pending user events in the message store.

11. The system of claim 7, wherein the processor is configured to process the one or more user events by processing the user event data including:

parsing the user event data associated with the one or more user events;

validating the user event data associated with the one or more user events; and processing the user event data associated with the one or more user events.

12. The system as claimed in claim 7, wherein the processor is further configured to:

monitor a resource of one or more clone ingestor instances to update the allocation of a clone ingestor instance to the tenant, wherein the monitoring of the one or more resources include calculating a metrics associated with at least one of a processor, a memory, and an associated delay in processing a user event.

* * * * *